(12) United States Patent
Riddle et al.

(10) Patent No.: US 6,591,299 B2
(45) Date of Patent: *Jul. 8, 2003

(54) METHOD FOR AUTOMATICALLY CLASSIFYING TRAFFIC WITH ENHANCED HIERARCHY IN A PACKET COMMUNICATIONS NETWORK

(75) Inventors: Guy Riddle, Los Gatos, CA (US); Robert L. Packer, Rancho Santa Fe, CA (US); Mark Hill, Los Altos, CA (US)

(73) Assignee: Packeteer, Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/155,936

(22) Filed: May 24, 2002

(65) Prior Publication Data

US 2002/0143939 A1 Oct. 3, 2002

Related U.S. Application Data

(63) Continuation-in-part of application No. 09/990,354, filed on Nov. 23, 2001, now Pat. No. 6,457,051, which is a continuation of application No. 09/198,090, filed on Nov. 23, 1998, now Pat. No. 6,412,000.
(60) Provisional application No. 60/066,864, filed on Nov. 25, 1997.

(51) Int. Cl.[7] .............................................. G06F 15/173
(52) U.S. Cl. ....................... 709/224; 709/223; 709/230; 709/234; 709/238; 709/242; 370/230; 370/235; 370/252; 370/351; 370/355; 370/356
(58) Field of Search ........................ 709/200, 220–226, 709/230, 232, 234–236, 238–239, 242, 245–246; 370/224–232, 235–237, 252–255, 351–356

(56) References Cited

U.S. PATENT DOCUMENTS

| | | | |
|---|---|---|---|
| 5,251,152 A | | 10/1993 | Notess |
| 5,495,426 A | | 2/1996 | Waclawsky et al. |
| 5,539,659 A | * | 7/1996 | McKee et al. ............... 709/224 |
| 5,781,726 A | * | 7/1998 | Pereira ........................ 709/200 |
| 5,838,919 A | | 11/1998 | Schwaller et al. |
| 5,870,561 A | | 2/1999 | Jarvis et al. |
| 5,903,559 A | | 5/1999 | Acharya et al. |
| 5,923,849 A | | 7/1999 | Venkatraman |
| 6,028,842 A | | 2/2000 | Chapman et al. |
| 6,046,980 A | | 4/2000 | Packer |
| 6,092,115 A | * | 7/2000 | Choudhury et al. ......... 709/235 |
| 6,137,782 A | | 10/2000 | Sharon et al. |
| 6,205,121 B1 | * | 3/2001 | Heuer ........................ 370/250 |
| 6,209,033 B1 | | 3/2001 | Datta et al. |
| 6,262,976 B1 | * | 7/2001 | McNamara ................. 709/220 |
| 6,263,368 B1 | * | 7/2001 | Martin ........................ 709/224 |
| 6,412,000 B1 | * | 6/2002 | Riddle et al. ................ 709/224 |
| 6,457,051 B1 | * | 9/2002 | Riddle et al. ................ 709/224 |

* cited by examiner

Primary Examiner—Bharat Barot
(74) Attorney, Agent, or Firm—Townsend and Townsend and Crew LLP; Kenneth R. Allen

(57) ABSTRACT

In packet communication, a method for automatically classifying packet flows for use in allocating bandwidth resources and the like by a rule of assignment of a service level. By rendering discoverable the attributes of a flow specification for packet flows, a finer grained hierarchy of classification is provided automatically that is based on information which is specific to the type of program or application supported by the flow and thus allowing greater flexibility in control over different flows within the same application. The method comprises applying individual instances of traffic classification paradigms to packet network flows based on selectable information obtained from a plurality of layers to define a characteristic class, then mapping the flow to the defined traffic class. The flow specification is provided with some application-specific attributes, some of which are discoverable. The discoverable attributes lead to an ability to automatically create sub-nodes of nodes for finer-grained control.

17 Claims, 7 Drawing Sheets

METHOD FOR AUTOMATICALLY CLASSIFYING TRAFFIC WITH ENHANCED HIERARCHY IN A PACKET COMMUNICATIONS NETWORK

CROSS-REFERENCES TO RELATED APPLICATIONS

This application claims priority from a commonly owned U.S. Provisional Patent Application, Serial No. 60/066,864, filed Nov. 25, 1997, in the name of Guy Riddle and Robert L. Packer, entitled "Method for Automatically Classifying Traffic in a Policy Based Bandwidth Allocation System."

This is a continuation-in-part of U.S. application Ser. No. 09/990,354 filed Nov. 23, 2001, now U.S. Pat. No. 6,457,051, in the name of Guy Riddle and Robert L. Packer, entitled Method For Automatically Classifying Traffic In A Packet Communications Network, which is a continuation of application Ser. No. 09/198,090 filed Nov. 23, 1998, now U.S. Pat. No. 6,412,000, also in the name of Guy Riddle and Robert L. Packer, also entitled Method For Automatically Classifying Traffic In A Packet Communications Network.

The following related commonly-owned U.S. patent application is hereby incorporated by reference in its entirety for all purposes: U.S. patent application Ser. No. 09/198,051, filed Nov. 23, 1998, still pending, in the name of Guy Riddle, entitled "Method for Automatically Determining a Traffic Policy in a Packet Communications Network."

Further, this application makes reference to the following commonly owned U.S. Patents and Applications, which are incorporated by reference herein in their entirety for all purposes:

U.S. Pat. No. 5,802,106, in the name of Robert L. Packer, entitled "Method for Rapid Data Rate Detection in a Packet Communication Environment Without Data Rate Supervision," relates to a technique for automatically determining the data rate of a TCP connection;

U.S. patent application Ser. No. 08/742,994, now U.S. Pat. No. 6,038,216, in the name of Robert L. Packer, entitled "Method for Explicit Data Rate Control in a Packet Communication Environment Without a Data Rate Supervision," relates to a technique for automatically scheduling TCP packets for transmission;

U.S. Pat. No. 6,046,980, in the name of Robert L. Packer, entitled "Method for Managing Flow Bandwidth Utilization at Network, Transport and Application Layers in Store and Forward Network," relates to a technique for automatically allocating bandwidth based upon data rates of TCP connections according to a hierarchical classification paradigm; and U.S. patent application Ser. No. 08/742,994 now U.S. Pat. No. 6,038,216 issued Mar. 14, 2000, in the name of Robert L. Packer, entitled "Method for Explicit Data Rate Control in a Packet Communication Environment Without a Data Rate Supervision," relates to a technique for automatically scheduling TCP packets for transmission.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to digital packet telecommunications, and particularly to management of network bandwidth based on information ascertainable from multiple layers of OSI network model. It is particularly useful in conjunction with bandwidth allocation mechanisms employing traffic classification in a digitally-switched packet telecommunications environment, as well as in monitoring, security and routing.

The ubiquitous TCP/IP protocol suite, which implements the world-wide data communication network environment called the Internet and is also used in private networks (Intranets), intentionally omits explicit supervisory function over the rate of data transport over the various media which comprise the network. While there are certain perceived advantages, this characteristic has the consequence of juxtaposing very high-speed packet flows and very low-speed packet flows in potential conflict for network resources, which results in inefficiencies. Certain pathological loading conditions can result in instability, overloading and data transfer stoppage. Therefore, it is desirable to provide some mechanism to optimize efficiency of data transfer while minimizing the risk of data loss. Early indication of the rate of data flow which can or must be supported is imperative. In fact, data flow rate capacity information is a key factor for use in resource allocation decisions. For example, if a particular path is inadequate to accommodate a high rate of data flow, an alternative route can be sought out.

Internet/Intranet technology is based largely on the TCP/IP protocol suite, where IP, or Internet Protocol, is the network layer protocol and TCP, or Transmission Control Protocol, is the transport layer protocol. At the network level, IP provides a "datagram" delivery service. By contrast, TCP builds a transport level service over the datagram service to provide guaranteed, sequential delivery of a byte stream between two IP hosts.

TCP flow control mechanisms operate exclusively at the end stations to limit the rate at which TCP endpoints emit data. However, TCP lacks explicit data rate control. The basic flow control mechanism is a sliding window, superimposed on a range of bytes beyond the last explicitly-acknowledged byte. Its sliding operation limits the amount of unacknowledged transmissible data that a TCP endpoint can emit.

Another flow control mechanism is a congestion window, which is a refinement of the sliding window scheme, which employs conservative expansion to fully utilize all of the allowable window. A component of this mechanism is sometimes referred to as "slow start".

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4·mean deviation, then packet loss is inferred and the data pending acknowledgment is retransmitted.

Data rate flow control mechanisms which are operative end-to-end without explicit data rate control draw a strong inference of congestion from packet loss (inferred, typically, by RTO). TCP end systems, for example, will "back-off", i.e., inhibit transmission in increasing multiples of the base RTT average as a reaction to consecutive packet loss.

Bandwidth Management in TCP/IP Networks

Conventional bandwidth management in TCP/IP networks is accomplished by a combination of TCP end systems and routers which queue packets and discard packets when certain congestion thresholds are exceeded. The discarded, and therefore unacknowledged, packet serves as a feedback mechanism to the TCP transmitter. (TCP end systems are clients or servers running the TCP transport protocol, typically as part of their operating system.)

The term "bandwidth management" is often used to refer to link level bandwidth management, e.g. multiple line support for Point to Point Protocol (PPP). Link level bandwidth management is essentially the process of keeping track of all traffic and deciding whether an additional dial line or ISDN channel should be opened or an extraneous one closed. The field of this invention is concerned with network level bandwidth management, i.e. policies to assign available bandwidth from a single logical link to network flows.

In U.S. Pat. No. 6,038,216, in the name of Robert L. Packer, entitled "Method for Explicit Data Rate Control in a Packet Communication Environment Without Data Rate Supervision," a technique for automatically scheduling TCP packets for transmission is disclosed. Furthermore, in U.S. Pat. No. 5,802,106, in the name of Robert L. Packer, entitled "Method for Rapid Data Rate Detection in a Packet Communication Environment Without Data Rate Supervision," a technique for automatically determining the data rate of a TCP connection is disclosed. Finally, in a U.S. patent application Ser. No. 08/977,376, now U.S. Pat. No. 6,046, 980, in the name of Robert L. Packer, entitled "Method for Managing Flow Bandwidth Utilization at Network, Transport and Application Layers in Store and Forward Network," a technique for automatically allocating bandwidth based upon data rates of TCP connections according to a hierarchical classification paradigm is disclosed.

Automated tools assist the network manager in configuring and managing the network equipped with the rate control techniques described in these copending applications. In a related copending application, a tool is described which enables a network manager to automatically produce policies for traffic being automatically detected in a network. It is described in a copending U.S. patent application Ser. No. 09/198,051, still pending in the name of Guy Riddle, entitled "Method for Automatically Determining a Traffic Policy in a Packet Communications Network," based on U.S. Provisional Patent Application Serial No. 60/066,864. The subject of the present invention is also a tool designed to assist the network manager.

While these efforts teach methods for solving problems associated with scheduling transmissions, automatically determining data flow rate on a TCP connection, allocating bandwidth based upon a classification of network traffic and automatically determining a policy, respectively, there is no teaching in the prior art of methods for automatically classifying packet traffic based upon information gathered from a multiple layers in a multi-layer protocol network.

Bandwidth has become an expensive commodity as traffic expands faster than resources and the need to "prioritize" a scarce resource becomes ever more critical. One way to solve this is by applying "policies" to control traffic classified as to type of service required in order to more efficiently match resources with traffic.

Traffic may be classified by type, e.g. E-mail, web surfing, file transfer, at various levels. For example, to classify by network paradigm, examining messages for an IEEE source/destination service access point (SAP) or a sub-layer access protocol (SNAP) yields a very broad indicator, i.e., SNA or IP. More specific types exist, such as whether an IP protocol field in an P header indicates TCP or UDP. Well known connection ports provide indications at the application layer, i.e., SMTP or HTTP.

Classification is not new. Firewall products like "Check-Point FireWall-1," a product of CheckPoint Software Technologies, Inc., a company with headquarters in Redwood City, Calif., have rules for matching traffic. Prior bandwidth managers classify by destination. The PacketShaper, a product of Packeteer, Inc., a company with headquarters in Cupertino, Calif., allows a user to manually enter rules to match various traffic types for statistical tracking, i.e., counting by transaction, byte count, rates, etc. However, manual rule entry requires a level of expertise that limits the appeal for such a system to network savvy customers. What is really needed is a method for analyzing real traffic in a customer's network and automatically producing a list of the "found traffic."

SUMMARY OF THE INVENTION

According to the invention, in a packet communication environment, a method is provided for automatically classifying packet flows for use in allocating bandwidth resources and the like by a rule of assignment of a service level. By rendering discoverable the attributes of a flow specification for packet flows, a finer grained hierarchy of classification is provided automatically that is based on information which is specific to the type of program or application supported by the flow and thus allowing greater flexibility in control over different flows within the same application. The method comprises applying individual instances of traffic classification paradigms to packet network flows based on selectable information obtained from a plurality of layers of a multi-layered communication protocol in order to define a characteristic class, then mapping the flow to the defined traffic class. The flow specification is provided with some application-specific attributes, some of which are discoverable. The discoverable attributes lead to an ability to automatically create sub-nodes of nodes for finer-grained control. The automatic classification is sufficiently robust to classify a complete enumeration of the possible traffic.

In the present invention network managers need not know the technical aspects of each kind of traffic in order to configure traffic classes and service aggregates bundle traffic to provide a convenience to the user, by clarifying processing and enables the user to obtain group counts of all parts comprising a service.

The invention will be better understood upon reference to the following detailed description in connection with the accompanying drawings.

Figure 1A:
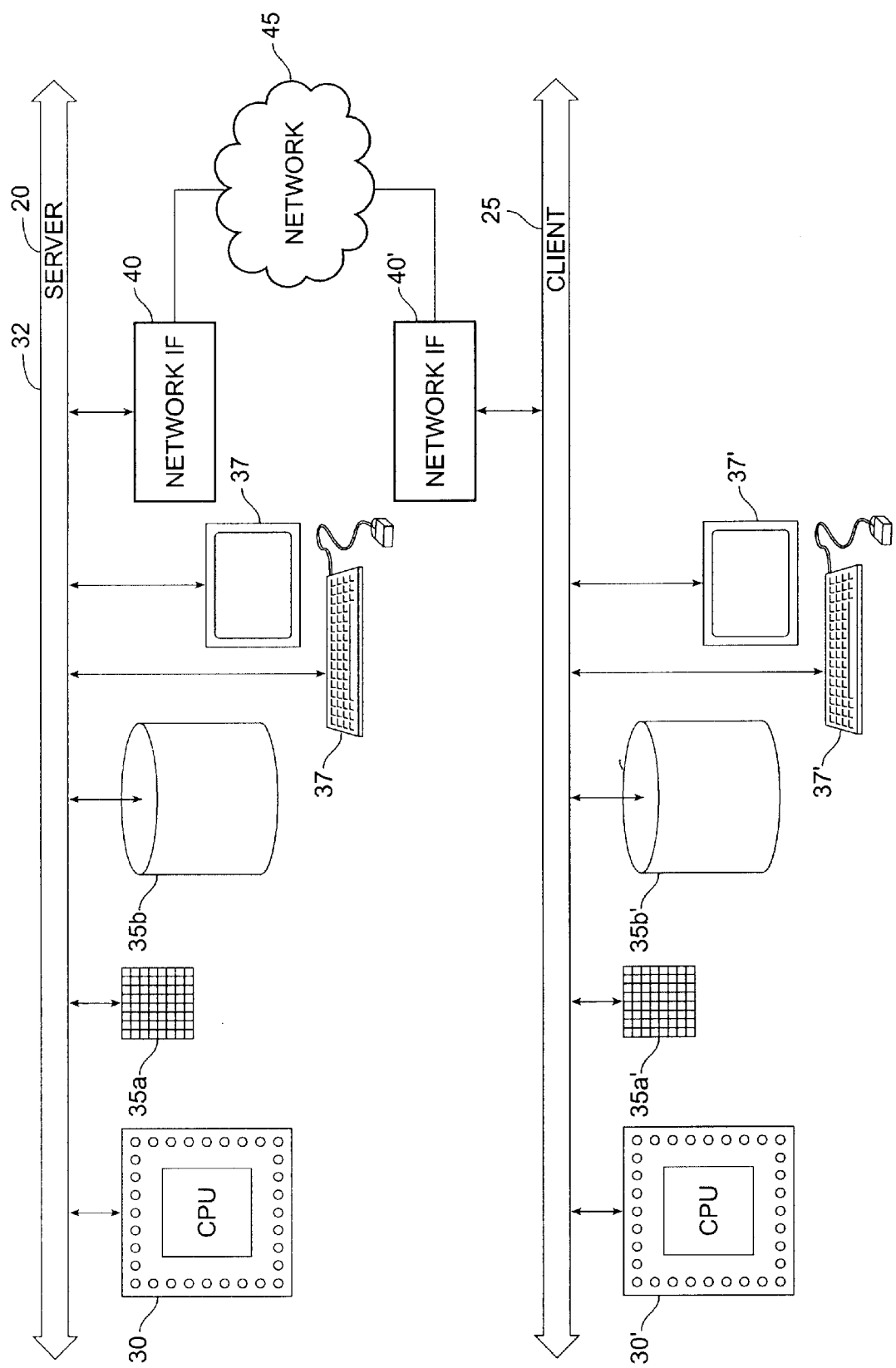
FIG. 1A depicts a representative client server relationship in accordance with a particular embodiment of the invention.

DESCRIPTION OF SPECIFIC EMBODIMENTS OF THE INVENTION 1.0 Introduction

The present invention provides techniques to automatically classify a plurality of heterogeneous packets in a packet telecommunications system for management of network bandwidth in systems such as a private area network, a wide area network or an internetwork. Systems according to the present invention enable network managers to: automatically define traffic classes, for which policies may then be created for specifying service levels for the traffic classes and isolating bandwidth resources associated with certain traffic classes. Inbound as well as outbound traffic may be managed. Below is a definitional list of terminology used herein.

List of Definitional Terms

ADMISSIONS CONTROL A policy invoked whenever a system according to the invention detects that a guaranteed information rate cannot be maintained. An admissions control policy is analogous to a busy signal in the telephone world.

CLASS SEARCH ORDER A search method based upon traversal of a N-ary tree data structure containing classes.

COMMITTED INFORMATION RATE (CIR) A rate of data flow allocated to reserved service traffic for rate based bandwidth allocation for a committed bandwidth. Also called a guaranteed information rate (GIR).

EXCEPTION A class of traffic provided by the user which supersedes an automatically determined classification order.

EXCESS INFORMATION RATE (EIR) A rate of data flow allocated to reserved service traffic for rate based bandwidth allocation for uncommitted bandwidth resources.

FLOW A flow is a single instance of a connection or packet-exchange activity. For example, all packets in a TCP connection belong to the same flow, as do all packets in a UDP session. A flow always is associated with a traffic class.

GUARANTEED INFORMATION RATE (GIR) A rate of data flow allocated to reserved service traffic for rate based bandwidth allocation for a committed bandwidth. Also called a committed information rate (CIR).

INSIDE On the LAN side of the bandwidth management device.

MATCHING RULE A description which is used to determine whether a flow matches a traffic class, e.g., "inside service:http", which will match any flows which are connected to an HTTP server on the "inside" of the bandwidth management device. Also known as "traffic specifications".

OUTSIDE On the WAN or Internet side of the bandwidth management device.

PARTITION Partition is an arbitrary unit of network resources.

POLICY A rule assigned to a given class that defines how the traffic associated with the class will be handled during bandwidth management.

POLICY INHERITANCE A method for assigning policies to flows for which no policy exists in a hierarchical arrangement of policies. For example, if a flow matches the traffic class for FTP traffic to Host A, and no corresponding policy exists, a policy associated with a less specific node, such as the traffic class which matches FTP traffic to any host, may be located and used.

POLICY BASED SCALING An adjustment of a requested data rate for a particular flow based upon the policy associated with the flow and information about the flow's potential rate.

SCALED RATE Assignment of a data rate based upon detected speed.

SERVICE LEVEL A service paradigm having a combination of characteristics defined by a network manager to handle a particular class of traffic. Service levels may be designated as either reserved or unreserved.

TRAFFIC CLASS A logical grouping of traffic flows that share the same characteristics—such as application, protocol, address, or set of addresses. A traffic class is defined with a series of matching rules.

TRAFFIC SPECIFICATION See "matching rule".

URI A Universal Resource Identifier is the name of the location field in a web reference address. It is also called a URL or Universal Resource Locator 1.1 Hardware Overview The method for classifying heterogeneous packets in a packet telecommunications environment of the present invention may be implemented in the C programming language and made operational on a computer system such as shown in FIG. 1A. This invention may be implemented in a client-server environment, but a client-server environment is not essential. This figure shows a conventional client-server computer system which includes a server 20 and numerous clients, one of which is shown as client 25. The use of the term "server" is used in the context of the invention, wherein the server receives queries from (typically remote) clients, does substantially all the processing necessary to formulate responses to the queries, and provides these responses to the clients. However, server 20 may itself act in the capacity of a client when it accesses remote databases located at another node acting as a database server.

The hardware configurations are in general standard and will be described only briefly. In accordance with known practice, server 20 includes one or more processors 30 which communicate with a number of peripheral devices via a bus subsystem 32. These peripheral devices typically include a storage subsystem 35, comprised of a memory subsystem 35a and a file storage subsystem 35b holding computer programs (e.g., code or instructions) and data, a set of user interface input and output devices 37, and an interface to outside networks, which may employ Ethernet, Token Ring, ATM, IEEE 802.3, ITU X.25, Serial Link Internet Protocol (SLIP) or the public switched telephone network. This interface is shown schematically as a "Network Interface" block 40. It is coupled to corresponding interface devices in client computers via a network connection 45.

Client 25 has the same general configuration, although typically with less storage and processing capability. Thus, while the client computer could be a terminal or a low-end personal computer, the server computer is generally a high-end workstation or mainframe, such as a SUN SPARC server. Corresponding elements and subsystems in the client computer are shown with corresponding, but primed, reference numerals.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to modem or network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

Figure 1B:
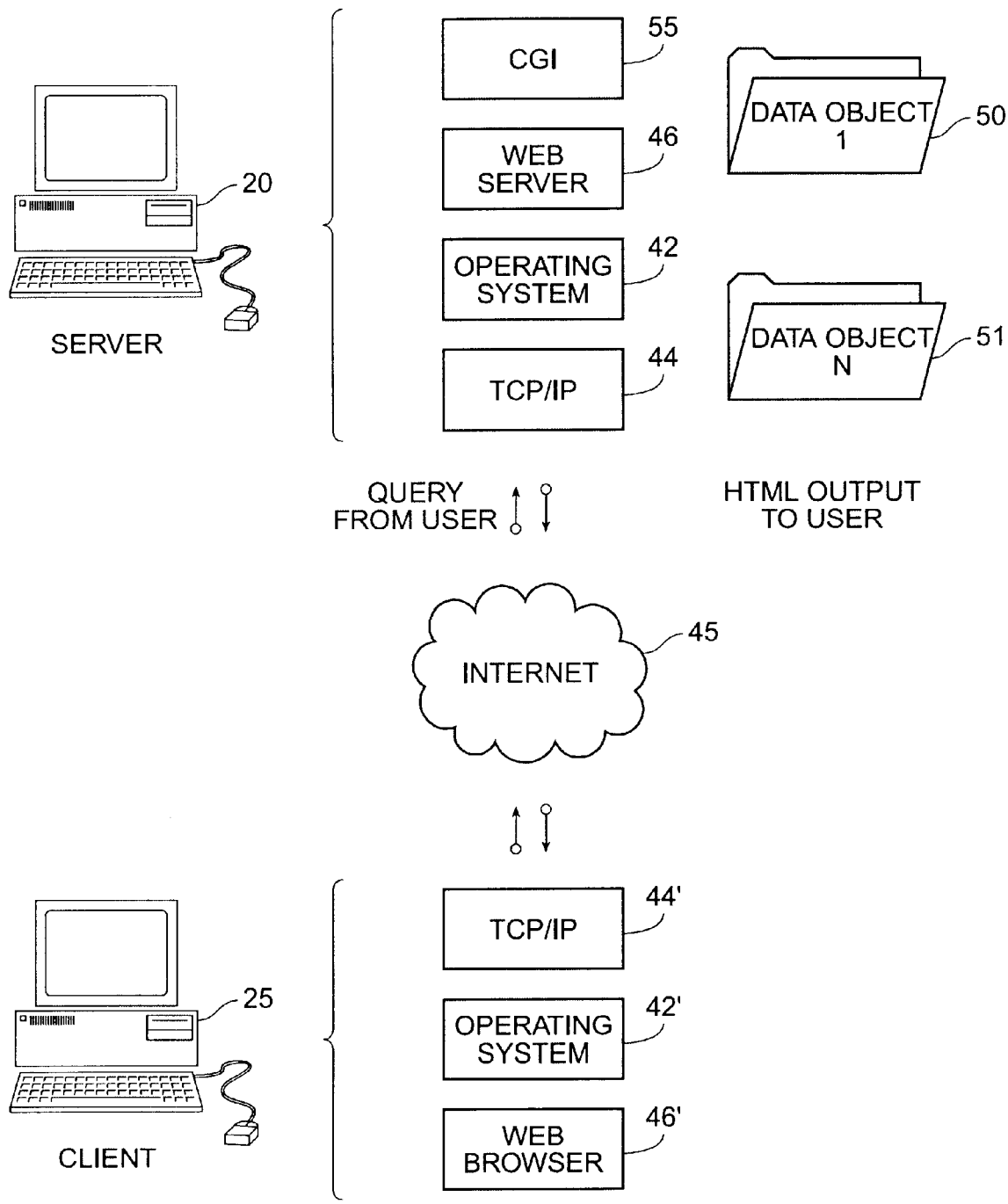
FIG. 1B depicts a functional perspective of the representative client server relationship in accordance with a particular embodiment of the invention.

FIG. 1B is a functional diagram of a computer system such as that of FIG. 1A. FIG. 1B depicts a server 20, and a representative client 25 of a plurality of clients which may interact with the server 20 via the Internet 45 or any other communications method. Blocks to the right of the server are indicative of the processing steps and functions which occur in the server's program and data storage indicated by blocks 35a and 35b in FIG. 1A. A TCP/IP "stack" 44 works in conjunction with Operating System 42 to communicate with processes over a network or serial connection attaching Server 20 to Internet 45. Web server software 46 executes concurrently and cooperatively with other processes in server 20 to make data objects 50 and 51 available to requesting clients. A Common Gateway Interface (CGI) script 55 enables information from user clients to be acted upon by web server 46, or other processes within server 20. Responses to client queries may be returned to the clients in the form of a Hypertext Markup Language (HTML) document outputs which are then communicated via Internet 45 back to the user.

Client 25 in FIG. 1B possesses software implementing functional processes operatively disposed in its program and data storage as indicated by block 35a' in FIG. 1A. TCP/IP stack 44', works in conjunction with Operating System 42' to communicate with processes over a network or serial connection attaching Client 25 to Internet 45. Software implementing the function of a web browser 46' executes concurrently and cooperatively with other processes in client 25 to make requests of server 20 for data objects 50 and 51. The user of the client may interact via the web browser 46' to make such queries of the server 20 via Internet 45 and to view responses from the server 20 via Internet 45 on the web browser 46'.

Network Overview

Figure 1C:
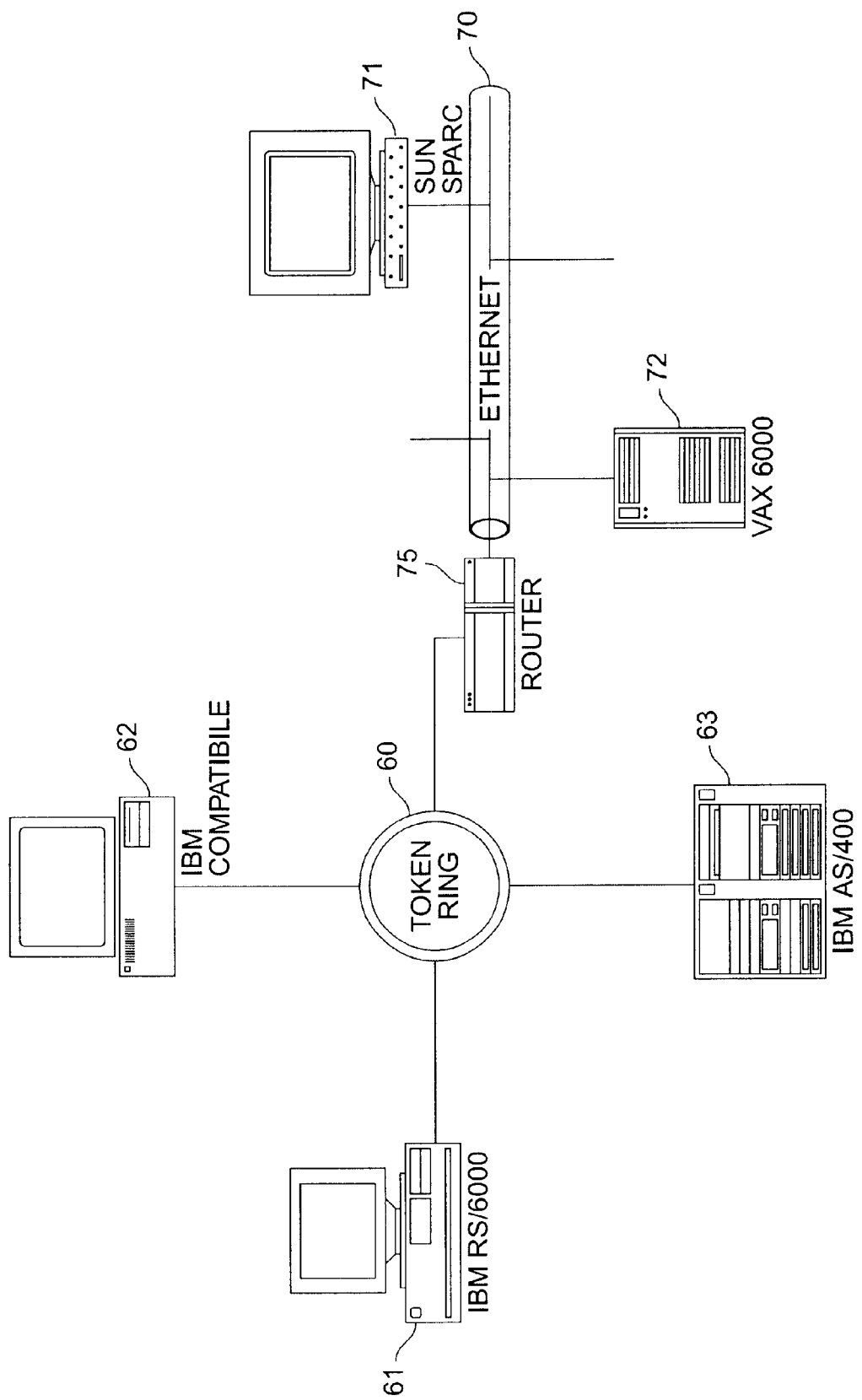
FIG. 1C depicts a representative internetworking environment in accordance with a particular embodiment of the invention.

FIG. 1C is illustrative of the internetworking of a plurality of clients such as client 25 of FIGS. 1A and 1B and a plurality of servers such as server 20 of FIGS. 1A and 1B as described herein above. In FIG. 1C, network 60 is an example of a prior art Token Ring or frame oriented network. Network 60 links host 61, such as an IBM RS6000 RISC workstation, which may be running the AIX operating system, to host 62, which is a personal computer, which may be running Windows, IBM OS/2 or a DOS operating system, and host 63, which may be an IBM AS/400 computer, which may be running the OS/400 operating system. Network 60 is internetworked to network 70 via a system gateway which is depicted here as router 75, but which may also be a gateway having a firewall or a network bridge. Network 70 is an example of an Ethernet network that interconnects host 71, which is a SPARC workstation, which may be running SUNOS operating system with host 72, which may be a VAX 6000 computer which may be running the VMS operating system (formerly available from Digital Equipment Corporation).

Router 75 is a network access point (NAP) of network 70 and network 60. Router 75 employs a Token Ring adapter and Ethernet adapter. This enables router 75 to interface with the two heterogeneous networks. Router 75 is also aware of the Inter-network Protocols, such as ICMP and RIP, which are described herein below.

Figure 1D:
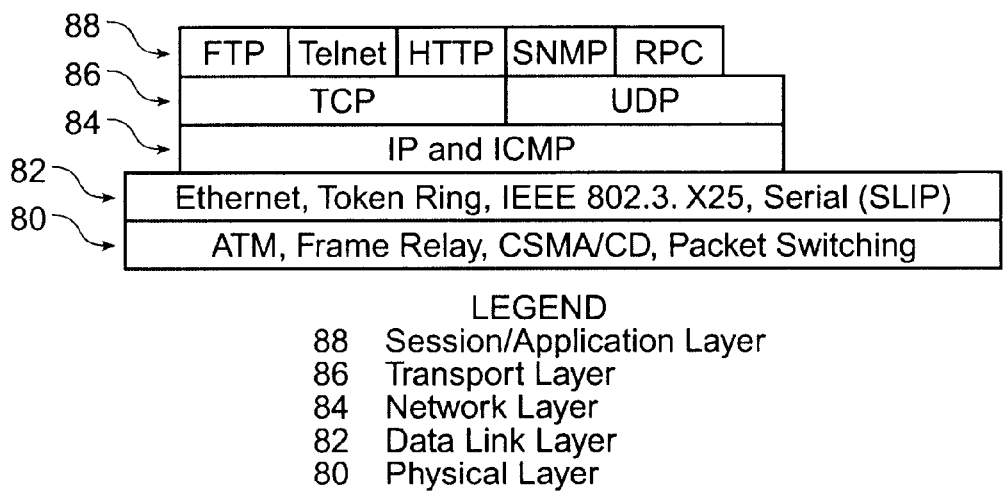
FIG. 1D depicts a relationship diagram of the layers of the TCP/IP protocol suite.

FIG. 1D is illustrative of the constituents of the Transmission Control Protocol/Internet Protocol (TCP/IP) protocol suite. The base layer of the TCP/IP protocol suite is the physical layer 80, which defines the mechanical, electrical, functional and procedural standards for the physical transmission of data over communications media, such as, for example, the network connection 45 of FIG. 1A. The physical layer may comprise electrical, mechanical or functional standards such as whether a network is packet switching or frame-switching; or whether a network is based on a Carrier Sense Multiple Access/Collision Detection (CSMA/CD) or a frame relay paradigm.

Overlying the physical layer is the data link layer 82. The data link layer provides the function and protocols to transfer data between network resources and to detect errors that may occur at the physical layer. Operating modes at the datalink layer comprise such standardized network topologies as IEEE 802.3 Ethernet, IEEE 802.5 Token Ring, ITU X.25, or serial (SLIP) protocols.

Network layer protocols 84 overlay the datalink layer and provide the means for establishing connections between networks. The standards of network layer protocols provide operational control procedures for internetworking communications and routing information through multiple heterogenous networks. Examples of network layer protocols are the Internet Protocol (IP) and the Internet Control Message Protocol (ICMP). The Address Resolution Protocol (ARP) is used to correlate an Internet address and a Media Access Address (MAC) for a particular host. The Routing Information Protocol (RIP) is a dynamic routing protocol for passing routing information between hosts on networks. The Internet Control Message Protocol (ICMP) is an internal protocol for passing control messages between hosts on various networks. ICMP messages provide feedback about events in the network environment or can help determine if a path exists to a particular host in the network environment. The latter is called a "Ping". The Internet Protocol (IP) provides the basic mechanism for routing packets of information in the Internet. IP is a non-reliable communication protocol. It provides a "best efforts" delivery service and does not commit network resources to a particular transaction, nor does it perform retransmissions or give acknowledgments.

The transport layer protocols 86 provide end-to-end transport services across multiple heterogenous networks. The User Datagram Protocol (UDP) provides a connectionless, datagram oriented service which provides a non-reliable delivery mechanism for streams of information. The Transmission Control Protocol (TCP) provides a reliable session-based service for delivery of sequenced packets of information across the Internet. TCP provides a connection oriented reliable mechanism for information delivery.

The session, or application layer 88 provides a list of network applications and utilities, a few of which are illustrated here. For example, File Transfer Protocol (FTP) is a standard TCP/IP protocol for transferring files from one machine to another. FTP clients establish sessions through TCP connections with FTP servers in order to obtain files. Telnet is a standard TCP/IP protocol for remote terminal connection. A Telnet client acts as a terminal emulator and establishes a connection using TCP as the transport mechanism with a Telnet server. The Simple Network Management Protocol (SNMP) is a standard for managing TCP/IP networks. SNMP tasks, called "agents", monitor network status parameters and transmit these status parameters to SNMP tasks called "managers." Managers track the status of associated networks. A Remote Procedure Call (RPC) is a programming interface which enables programs to invoke remote functions on server machines. The Hypertext Transfer Protocol (HTTP) facilitates the transfer of data objects across networks via a system of uniform resource indicators (URI).

The Hypertext Transfer Protocol is a simple protocol built on top of Transmission Control Protocol (TCP). It is the mechanism which underlies the function of the World Wide Web. The HTTP provides a method for users to obtain data objects from various hosts acting as servers on the Internet.

2.0 Traffic Class

A traffic class (or "class") is broadly defined as a grouping of traffic flows that share the same characteristics. A traffic class is defined with one or more matching rules. Traffic classes may have the property of being directional, i.e. all traffic flowing inbound will belong to different traffic classes and be managed separately from traffic flowing outbound. The directional property enables asymmetric classification and control of traffic, i.e., inbound and outbound flows belong to different classes which may be managed independent of one another.

Traffic classes may be defined at any level of the IP protocol as well as for other non-IP protocols. For example, at the IP level, traffic may be defined as only those flows between a specified set of inside and outside IP addresses or domain names. An example of such a low level traffic class definition would be all traffic between my network and other corporate offices throughout the Internet. At the application level, traffic classes may be defined for specific URIs within a web server. Traffic classes may be defined having "Web aware" class attributes. For example, a traffic class could be created such as all URIs matching "*.html" for all servers, or all URI patterns matching "*.gif" for server X, or for access to server Y with URI pattern "/sales/*" from client Z, wherein '*' is a wildcard character, i.e., a character which matches all other character combinations. Traffic class attributes left unspecified will simply match any value for that attribute. For example, a traffic class that accesses data objects within a certain directory path of a web server is specified by a URI pattern of the directory path to be managed, e.g. "/sales/*".

2.1 Classifying Traffic

The present invention provides a method for classifying traffic according to a definable set of classification attributes selectable by the manager, including selecting a subset of traffic of interest to be classified. The invention provides the ability to classify and search traffic based upon multiple orthogonal classification attributes.

Traffic class membership may be hierarchical. Thus, a flow may be classified by a series of steps through a traffic class tree, with the last step (i.e., at the leaves on the classification tree) mapping the flow to a policy. Some applications may be classified by application-specific attributes as well. For example, web traffic may also be classified by HTTP header types such as Content-Type (MIME type) or User-Agent. Citrix traffic may be classified by application name or Citrix client name. (A Citrix client name is the client name used under the Critix (brand) technique of client-server interaction. RTP (real-time protocol) traffic may be classified by encoding name or media type.

A classification tree is a data structure representing the hierarchical aspect of traffic class relationships. Each node of the classification tree represents a class, and has a traffic specification, i.e., a set of attributes or characteristics describing the traffic associated with it. Leaf nodes of the classification tree may contain policies. According to a particular embodiment, the classification process checks at each level if the flow being classified matches the attributes of a given traffic class. If it does, processing continues down to the links associated with that node in the tree. If it does not, the class at the level that matches determines the policy for the flow being classified. If no policy specific match is found, the flow is assigned the default policy.

In a preferred embodiment, the classification tree is an N-ary tree with its nodes ordered by specificity. For example, in classifying a particular flow in a classification tree ordered first by organizational departments, the attributes of the flow are compared with the traffic specification in each successive department node and if no match is found, then processing proceeds to the next subsequent department node. If no match is found, then the final compare is a default "match all" category. If, however, a match is found, then classification moves to the children of this department node. The child nodes may be ordered by an orthogonal paradigm such as, for example, "service type." Matching proceeds according to the order of specificity in the child nodes. Processing proceeds in this manner, traversing downward and from left to right in FIGS. 2A and 2B, which describe a classification tree, searching the plurality of orthogonal paradigms. Key to implementing this a hierarchy is that the nodes are arranged in decreasing order of specificity. This permits search to find the most specific class for the traffic before more general.

The table below depicts exemplary components from which traffic classes may be built. Note that the orientation of the server (inside or outside) may be specified. As noted above, any traffic class component may be unspecified, i.e., set to match any value.

| Components of a Traffic Class Specifier | | |
|---|---|---|
| Inside (Client or Server) | Global | Outside (Server or Client) |
| IP Address/ Domain Name Port Number MAC Address | TCP or UDP Service e.g., WWW, FTP, RealAudio, etc. URI pattern for Web Service, MIME type for Web Service IPX Service SNA Service LAT Service IP precedence Application Specific Attributes | IP Address/ Domain Name Port Number MAC Address |

Figure 2A:
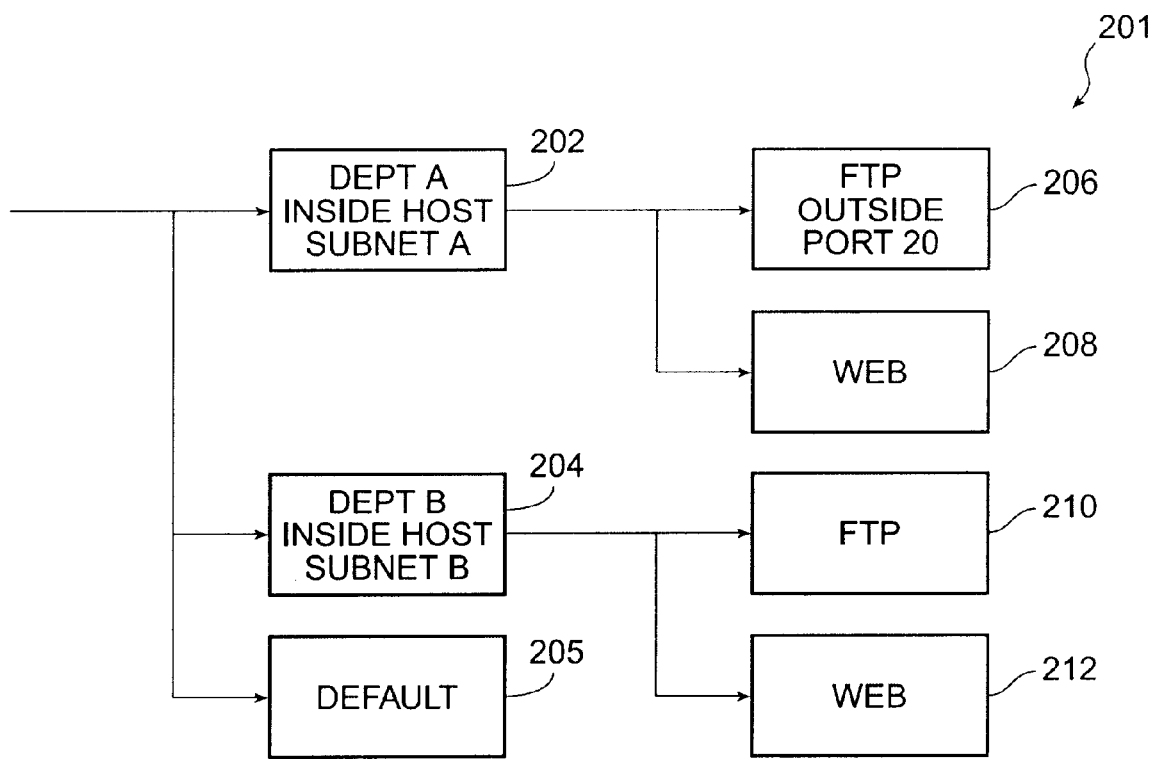
FIGS. 2A–2B depict representative divisions of bandwidth.
Figure 2B:
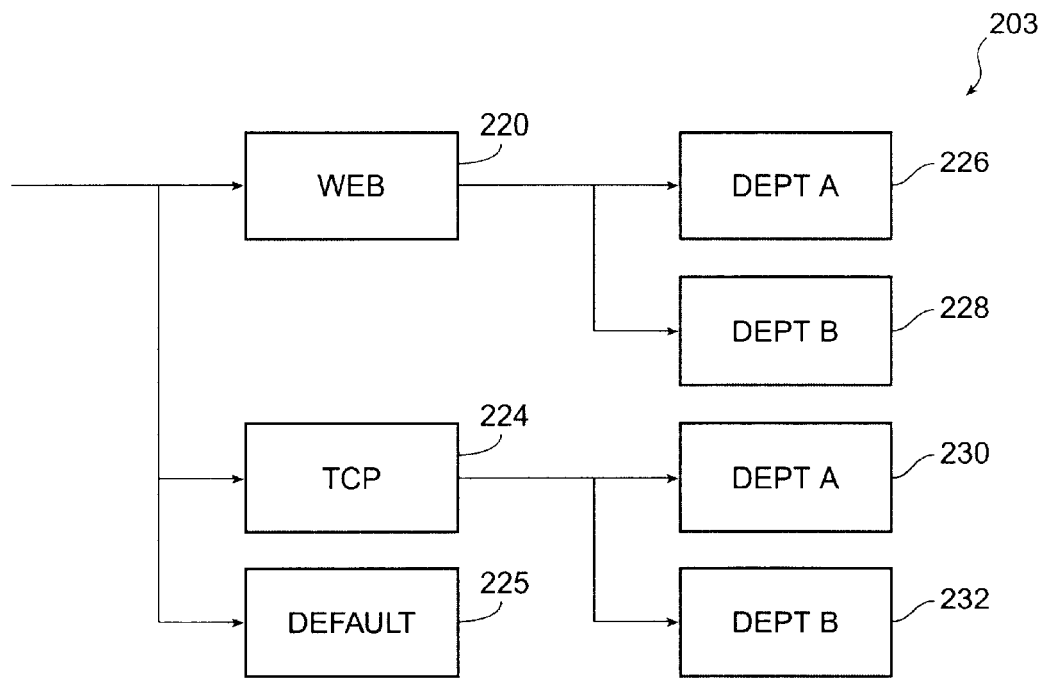

As an example, FIGS. 2A and 2B depict representative classifications of traffic made by a hypothetical network manager in order to accomplish particular allocations of bandwidth. In FIG. 2A, the network manager has decided to divide her network resources first by allocating bandwidth between Departments A and B. FIG. 2A shows the resulting classification tree 201, in which Department A bandwidth resources 202 and Department B bandwidth resources 204 each have their own nodes representing a specific traffic class for that department. Each traffic class may have one or more rules which are used for determining whether a flow matches that traffic class. For example, in FIG. 2A, the Department A resources node 202 has the matching rule Inside Host Subnet A associated with it. Next, the network manager has chosen to divide the bandwidth resources of Department A between two applications. She allocates an FTP traffic class 206 and a World Wide Web server traffic class 208. Each of these nodes may have a separate policy attribute associated with them. For example, in FIG. 2A, the FTP node 206 for has an attribute Outside port 20 associated with it. Similarly, the network manager has chosen to divide network bandwidth resources of Departnent B into an FTP server traffic class 210 and a World Wide Web server traffic class 212. Each may have their own respective policies.

FIG. 2B shows a second example 203, wherein the network manager has chosen to first divide network bandwidth resource between web traffic and TCP traffic. She creates three traffic nodes, a web traffic node 220, a TCP traffic node 224 and a default node 225. Next, she divides the web traffic among two organizational departments by creating a Department A node 226, and a Department B node 228. Each may have its own associated policy. Similarly, she divides TCP network bandwidth into separate traffic classes by creating a Department A node 230 and a Department B node 232. Each represents a separate traffic class which may have its own policy.

All traffic which does not match any user specified traffic class falls into an automatically created default traffic class which has a default policy. In FIG. 2A, the default category is depicted by a default node 205, and in FIG. 2B, the default category is depicted by a default node 225.

3.1 Traffic Discovery

Network traffic is classified under existing classes, beginning with the broadest classes, in inbound and outbound traffic classes which are protocol layer independent. For example, a particular instance of traffic may be classified according to its transport layer characteristics, e.g., Internet Protocol port number, as well as its application layer information, e.g., SMTP. In addition to application layer information, there may be attributes of the application upon which traffic classification can be based. For example, with SMTP, an attribute might be the length of the message or header information of the message or whether attachments are present. For an end-user application, such as a Lotus Notes database manager, the type of data might also be the basis of traffic classification. The key is that the flow specification must have some of its attributes discoverable in the course of the classification processing. Characteristics such as MIME types may also be discovered. Standard protocols, such as, IPX, SNA, and services, such as, SMTP and FTP are recognized for discovery. Classification is performed to the most specific level determinable. For example, in select embodiments, non-IP traffic, such as SNA, may be classified only by protocol, whereas within Internet Protocol, TCP or UDP traffic may be classified to the service level as indicated in the "/etc/services" file. Classification beyond a determined terminal classification level is not performed. For example, in a select embodiment, a class matching "ipx" or "nntp" will not be further classified.

3.1.1 Service Aggregates

A service aggregate is provided for certain applications that use more than one connection in a particular conversation between a client and a server. For example, an FTP client in conversation with an FTP server employs a command channel and a data transfer channel, which are distinct TCP sessions on two different ports. In cases where two or three TCP or UDP sessions exist for each conversation between one client and one server, it is useful to provide a common traffic class i.e., the service aggregate, containing the separate conversations. In practice, these types of conversations are often between the same two hosts, but using different ports. According to the invention, a class is created with a plurality of matching rules, each matching various component conversations.

3.1.2 Classification Under Specified Criterion

Classification of traffic into a tree is performed by traversing the tree of traffic classes, starting at the root and proceeding through each child of the root, comparing the flow being classified against the matching rules associated with each traffic class. The flow is defined as "matching" a class if its characteristics match any one of the matching rules that is used to define the class. When the flow matches a class, then if that traffic class has children, the flow will be compared against each of the children to determine if there is a more specific match—otherwise, the processing stops and the flow is assigned to that traffic class. A marker is placed in match_all default nodes so that when match processing reaches the marker, the classification processing depicted in flowchart 403 terminates, and the flow is assigned to the default class that was reached.

3.1.3 Default Suggested Policies

A default policy may be suggested or, in select embodiments, automatically applied, to a traffic class which has been discovered. Applying suggested or default policies for a new class at a user's option is described in a copending, commonly owned, U.S. patent application Ser. No. 09/198, 051, entitled, "Method for Automatically Determining a Traffic Policy in a Packet Communications Network," which is incorporated herein by reference in its entirety for all purposes.

3.1.4 Analysis of Data in Determining Traffic Class

In a preferable embodiment, classification can extend to examination of the data contained in a flow's packets. Certain traffic may be distinguished by a signature even if it originates with a server run on a non-standard port, for example, an HTTP conversation on port 8080 would not be otherwise determinable as HTTP from the port number. Further analysis of the data is conducted in order to determine classification in instances where: 1) FTP commands are used to define server ports, 2) HTTP protocol is used for non-web purposes. The data is examined for indication of push traffic, such as Pointcast Network-type traffic (a type of traffic marketed by InfoGate of San Diego, Calif.), which uses HTTP as a transport mechanism. These uses may be isolated and classified into a separate class. Marimba and Pointcast can be distinguished by looking into the data for a signature content header in the get request. Pointcast has URLs that begin with "/FIDO-1/." Other applications in which protocol can be inferred from data include Telnet traffic. Both tn3270 and tn3270E (emulation) may be detected by looking into data and given a different class. Telnet traffic has option negotiations which may indicate an appropriate class.

3.1.5 Identity of Traffic Based Upon Resource Creator's Class

A flow's traffic class may be inferred by observing the existence of other flows that are known to be related, between the same two nodes as the flow being classified. This method is used to detect Real Time Protocol (RTP) for point-to-point telephony, RTP for broadcast streaming, CCITT/ITU, H323-internet telephony over the Internet (bidirectional) and RTSP real time streaming protocol (unidirectional).

3.1.6 Dynamic Ports

Some applications establish connections to a well-known port number. Other applications use dynamic ports, by first connecting to a well-known port number, and then being redirected to another port number which is random or dynamically generated. For example, in a database application, a client may connect to the database server's well-known port number. At this location, a load-balancing server may be running which is aware of all of the other port numbers that are listened to by instances of the database application. The load-balancing server will redirect the client to the port number of the least-loaded database server instance.

3.2 Traffic Discovery Processing

Figure 3:
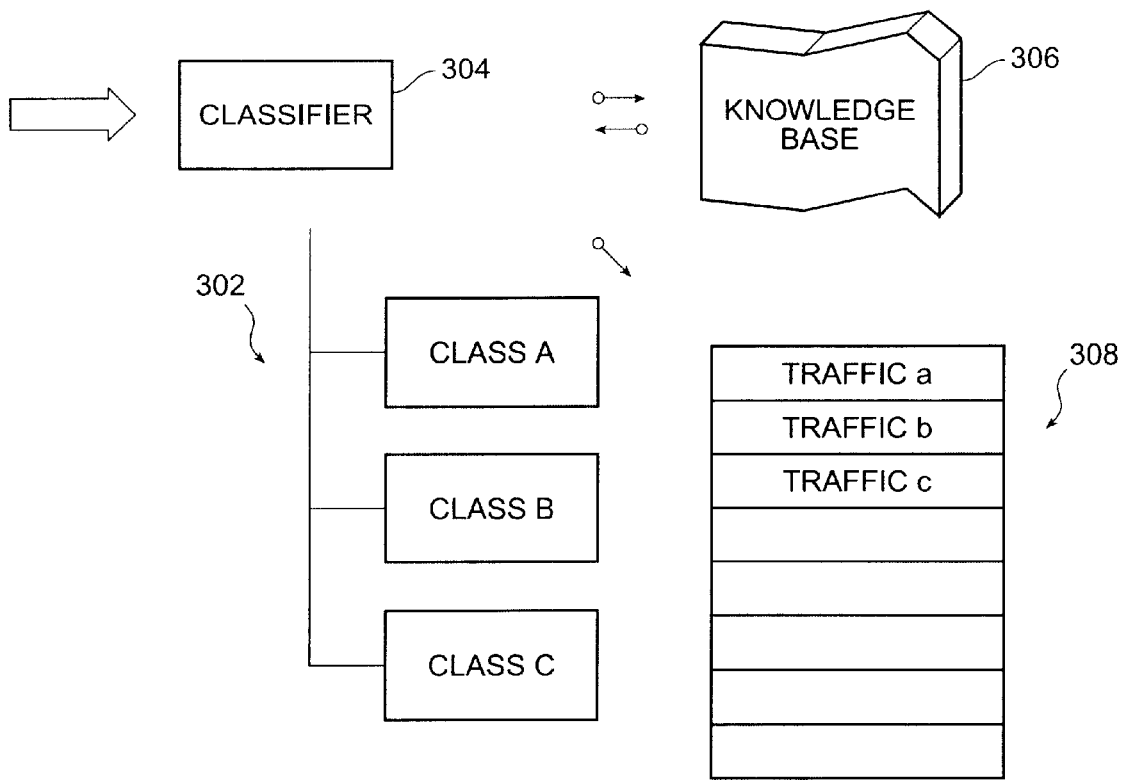
FIG. 3 depicts a component diagram of processes and data structures in accordance with a particular embodiment of the invention.

FIG. 3 depicts components of a system for discovering traffic according to the invention. A traffic tree 302 is provided in which new traffic will be discovered under a particular member class node. The traffic tree may have a hierarchy of nodes (Class A, B C) and corresponding sub-nodes under the nodes. A traffic classifier 304 detects services for incoming traffic. Alternatively, the classifier may start with a service and determine the hosts using it. A knowledge base 306 contains heuristics for determining traffic classes. The knowledge base may be embodied in memory, file, executable code, or a database. In a preferred embodiment, the knowledge is contained within a data structure resident in memory, and in executable code. A plurality of saved lists 308 stores identifying characteristics of classified traffic pending incorporation into traffic tree 302. In select embodiments, entries for each instance of traffic may be kept in one of the plurality of saved lists, each of which is associated with a traffic class which is marked to indicate that discovery is enabled on it. If there are attributes that are specific to an application, the entries may contain such attributes. In alternate embodiments, a copy of an entry and a count of duplicate copies for the entry is maintained.

Figure 4A:
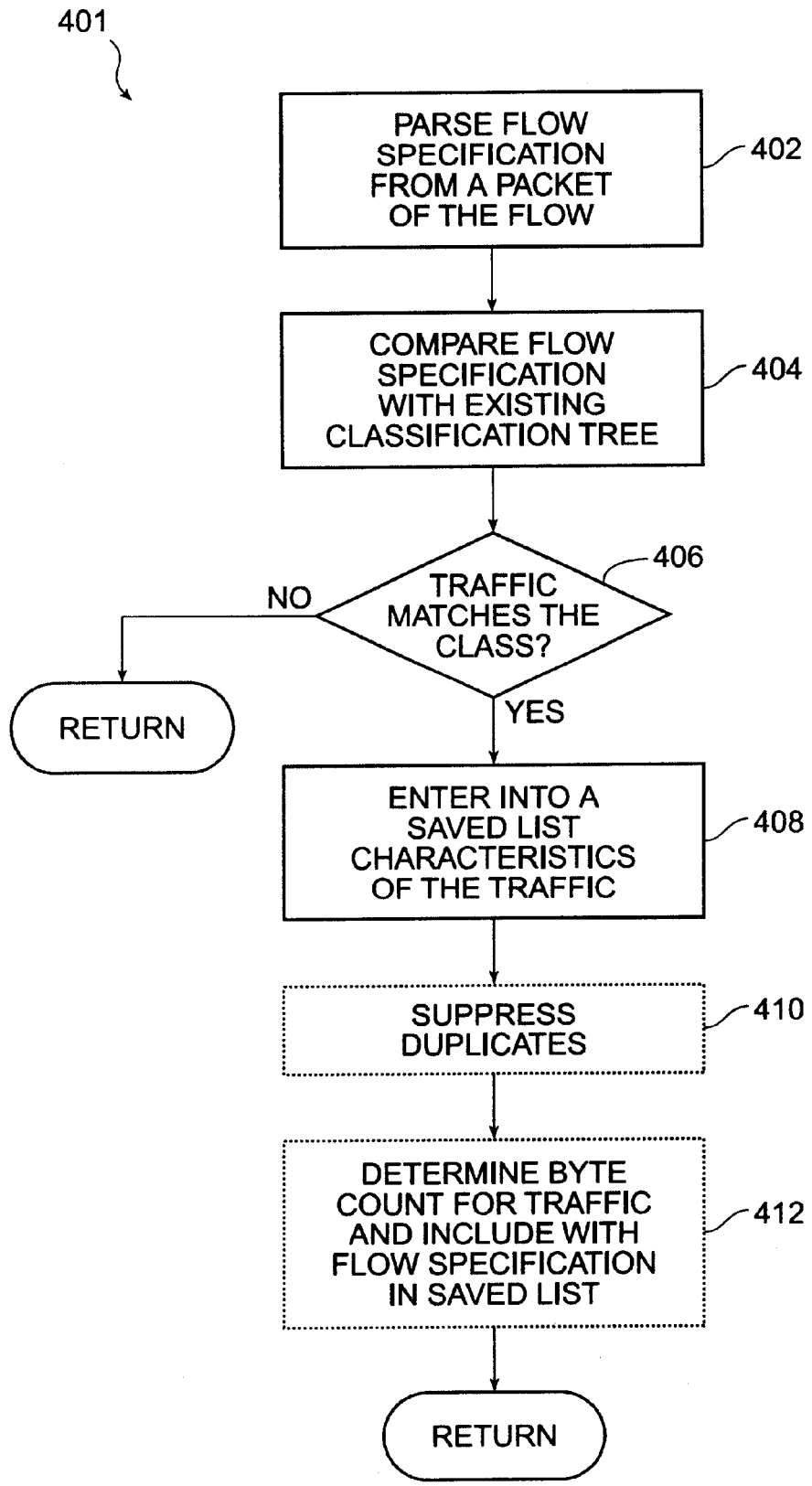
FIGS. 4A–4B depict flowcharts of process steps in automatically classifying traffic in accordance with a particular embodiment of the invention.

FIG. 4A depicts a flowchart 401 of processing steps for discovering traffic. In a step 402, a flow specification is parsed from the flow being classified. The flow specification may include attributes of the application associated with the flow. Then in a step 404, the flow specification parsed from the flow in step 402 is compared with the traffic specifications in each node of the classification tree. Rules are checked starting from most specific to least specific. In a decisional step 406, a determination is made if traffic matches one of the classes that are marked for discovery. If this is so, then in a step 408, an entry is made in a list of identifying characteristics, such as protocol type, IP protocol number, server port, traffic type if known, application-specific attributes, or a time of occurrence of the traffic. In an optional step 410, duplicate instances having the same identifying characteristics are suppressed, in favor of keeping a count of the duplicates and a most recent time traffic with these identifying characteristics was encountered. In an optional step 412, a byte count of traffic of this type has been detected is included. It should be noted that as a result of the traffic classification process, a flow will always match some traffic class. If it does not match anything specific, it will match a match-all (default) class. Also, it should be noted that if a flow matches a class that is marked for discovery, information about the flow will always be recorded in the list of saved characteristics.

In a preferred embodiment, processing according to flowchart 401 may execute on multiple instances of saved list 308.

3.2.1 Displaying Results to a User

In an optional step 413 (not shown), after the processing of flowchart 401 completes or at periodic intervals or on demand, a list of traffic classes produced in steps 402 through 412 is displayed to a network manager. The list may be sorted by any well-known criteria such as: 1) most "hits" during a recent interval, 2) most recently-seen (most recent time first), 3) most data transferred (bytes/second) during some interval, or a moving average. The user may choose an interval length or display cutoff point (how many items, how recent, at least B bytes per second, or other thresholds). The Network manager may then take some action (e.g. pushing a button) to select the traffic types she wishes to add to the classification tree. The display can be hierarchical, as depicted in lines (3) below:

FTP (3)
FTP-cmd
FTP-data
Lotus
Lotus_database 1
Lotus_database 2
Lotus_database 2_video
to-host1
tcp
FTP
FTP-cmd
FTP-data
HTTP
images
java
text
TCP-port-9999 wherein the "TCP-port-9999" entry is a traffic class which was discovered as a result of an application which was making repeated or simultaneous connections to TCP port 9999, and for which there was no other information available to allow matching on a specific class for that application (it was not an application known in the knowledge base.)

The italicized terms are examples of sub-nodes with application-specific characteristics.

In a related embodiment, a threshold for display or class creation of well-known traffic types is provided.

3.2.2 Interval Based Incorporation

In an alternative embodiment, at select intervals of time, items in the saved list of traffic characteristics are analyzed, and either 1) recognized and a corresponding traffic class is added to the tree, or 2) (for repeated attempts to request a server connection port, IP subprotocol type, or ethertype that is not otherwise known in the knowledge base, upon exceeding a certain threshold) a class for the traffic is created and added to the classification tree.

Figure 4B:
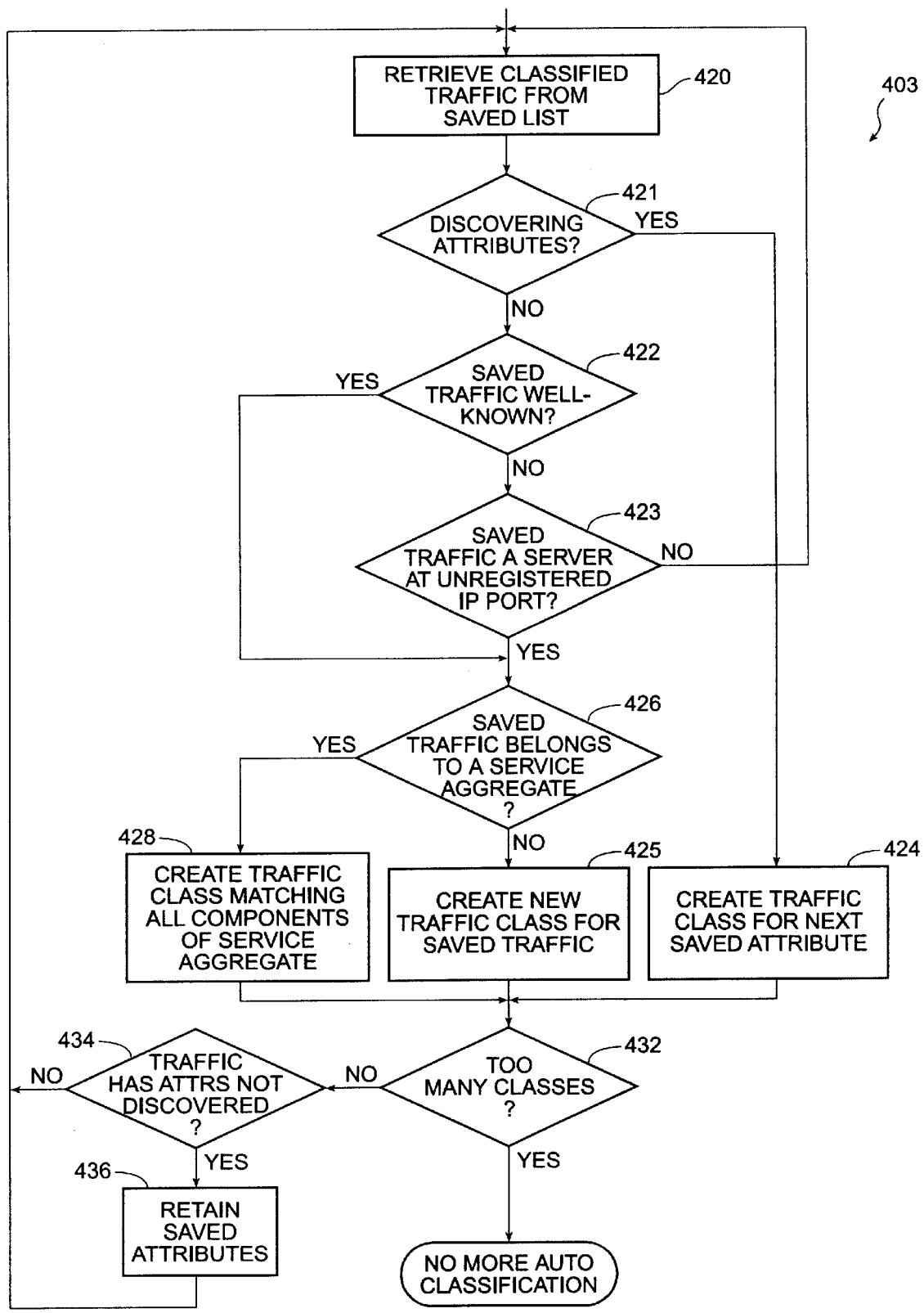

FIG. 4B depicts a flowchart 403 of the processing steps for integrating traffic classes into a classification tree in an embodiment. Processing steps of flowchart 403 create new classes in the classification tree, based upon the information saved in the lists of traffic characteristics. This is done periodically at a defined interval of seconds, such as 30 second in a preferred embodiment. In a step 420, an instance of saved traffic is retrieved from the saved traffic list 308. Thereafter, a test is made to determine if discovery is occurring under a class for which discovery of attributes occurs (that is, a class which corresponds to an application which has application-specific attributes which may be discovered). (step 421). If true, then the process proceeds directly to the step of creating a node for a traffic class for the next attribute that was saved (step 424). Elements on the list of discoverable attributes are assigned a processing priority relative to one another. It is a characteristic of the product that the processing priority ("ordering") may be pre-defined or may be configurable by the user. (While the characteristic of order is a part of the invention, the mechanism for fixing or for reconfiguring the ordering is not a part of this invention.) If the process is not in a state of discovering attributes, then in an alternative decisional step 422, the instance of saved traffic is examined to determine whether it is well-known (e.g., protocol type, assigned port number) and a name representing its type exists. If this is so then processing continues with a test of whether the saved traffic belongs to a service aggregate in step 426. Otherwise, in a step 423 the instance of saved traffic is examined to determine whether it appears to be a server connection port of an unregistered IP port (or a port that has not been configured). If this is not so then, processing continues with the next traffic class in the saved list in step 420. In decisional step 426, the instance of saved traffic is examined to determine whether it belongs to a service aggregate. For example, an FTP session has one flow that is used to exchange commands and responses and a second flow that is used to transport data files. If the traffic does belong to a service aggregate, then in a step 428, a traffic class is created which will match all components of the service aggregate. In a step 425, a new traffic class is created to match the instance of saved traffic.

In an optional step (not shown), a suggested policy is determined for the traffic class created in step 425. Next, in a decisional step 432, a limit is checked to verify that the total number of traffic classes has not exceeded a specified maximum. If the limit on classes has not been reached, then the traffic is checked to determine if there are still attributes for which classes have not been discovered (step 434) and if so, then the attributes are retained in the list (step 436). In either case, the process is repeated from step 420.

In a related embodiment in place of steps 424, 425 or 428, a display of traffic classes, sorted by most recently used, most hits, number of bytes received during any interval, which is determined by a plurality of time stamps, is available on demand to a network manager. The network manager then manually indicates that the traffic is to be added to the tree.

In a particular embodiment a threshold is employed to determine traffic for which a separate class should be added. A minimum usage threshold indicates whether a particular port has been used at least n times in the last s seconds. (This applies only in those instances where there is an identifiable port.) If traffic is well known, i.e., SMTP, a new traffic class is created immediately, i.e., threshold is equal to one hit per minute; otherwise, the threshold is set equal to a fixed, arbitrarily-configured value, for example, two to ten thousand hits per minute. A new class for traffic is given a generic name, e.g., TCP-Port-99. Entries for traffic over a certain age, for example one minute old, are discarded.

In a related embodiment, another method of identifying an individual traffic class is to detect simultaneous connections to the same host port from different clients. This provides an indication that the port is a well-known connection port.

Traffic classes are created for any combination of the above mentioned categories. A flag is added to all traffic classes so created in order to indicate that it is the product of the auto classifier.

3.2 Command Language Interface:

In a particular embodiment, function of the classifier 304 is controlled by a command language interface. Below is a plurality of command language interface commands.

setup discover {on|off} To activate autoclassification for various classes to detect well-known protocols and services:

class discover <tclass>{inside/outside/both} To turn on autoclassification (a.k.a. discovery) under a class to detect services with the host on the inside, the outside, or both directions.

class discover <tclass> off To turn off use.

The new classes have names in the format of lines below:

<service> or

<protocol>_Port_<number> or

<service>_<attribute>[_<attribute>_<attribute> . . . ]

where <protocol> is either TCP or UDP.

If a heretofore unknown server-connection port appears to be "well used", an entry of the second type is created. The threshold for creation is for example 11 hits with no more than 1 minute (granularity of checking is at least 30 seconds between running successive discovery or autoclassification processes) between any two hits. For example:

inbound/inside/ftp http sna

TCP_port_505

Lotus_database2_video 3.3 Syntax of Traffic Specifications (a.k.a. Matching Rules):

Flow specifications and traffic specifications may have an inside service field and an outside service field. (For some protocols or service types, inside and outside are not distinguished.) Each will have values of SVC_UNKNOWN (0), SVC_CLIENT (1), or a number greater than 1, which is the service index, an index into the global table gServiceTable. If a type of service is known for a connection, the service field at a particular side will be set to SVC_CLIENT and the service field at the opposite side will be the index into gServiceTable. If a type of service is not known for the traffic, both inside service field and outside service field will be SVC_UNKNOWN. A person of reasonable skill in the art will appreciate that other embodiments for the table, such as representing the information contained therein as text strings or by any one of a plurality of possible encoding schemes, are realizable without departing from the present invention.

Therefore, a traffic specification can have "outside service:http" (or just "outside HTTP") which is different than "outside tcp port:80". The first will match HTTP on any port while the second will match anything on port 80 (including Pointcast and Marimba).

Specifying an aggregate traffic specification "service:<agg>" identifies the traffic specifications for various traffic belonging to the service. Specifying "class new inbound cdls outside dls" is the same as "class new inbound cdls outside service:dls-wpn" and "class tspec add cdls outside service:dls-rpn". Most services which are known in the knowledge base will create a class that encompasses all of the members of the aggregate.

Network managers need not be aware of services which are known to be derivative of others, e.g., Pointcast and Marimba are special cases of HTTP and tn3270 is a special case of Telnet, in order to work with the system.

4.0 Conclusion

In conclusion, the present invention provides for an automatic determination of a policy for a packet telecommunications system wherein bandwidth is allocated to requesting flows according to automatically determined application requirements. An advantage of traffic classification techniques according to the present invention is that network managers need not know the technical aspects of each kind of traffic in order to configure traffic classes. A further advantage of the present invention is that traffic classes may include application-specific attributes such as a MIME type for web traffic.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A method for automatically classifying traffic in a packet communications network, said network having any number of flows, including zero, comprising the steps of:
   parsing a packet into a first flow specification, wherein said first flow specification contains at least one instance of any one of the following:
      a protocol family designation,
      a direction of packet flow designation,
      a protocol type designation,
      a pair of hosts,
      a pair of ports,
      in HTTP protocol packets, a pointer to a MIME type; thereupon,
   matching the first flow specification of the parsing step to a plurality of classes represented by a plurality of nodes, each node having a traffic specification; thereupon,
   if a matching node was not found in the matching step, associating said first flow specification with one or more newly-created nodes; thereupon,
   incorporating said newly-created node into said plurality of nodes.

2. A method for automatically classifying traffic in a packet communications network, said network having any number of flows, including zero, comprising the steps of:
   determining application type of a flow; thereafter
   for said application type of said flow, parsing a packet of said flow into a first flow specification, said first flow specification containing information as attributes, said attributes being specific to said application type and wherein selected ones of said attributes are discoverable; thereupon
   matching the first flow specification of the parsing step to a plurality of classes represented by a plurality of nodes of a classification tree type, each said classification tree type node having a traffic specification; thereupon
   if a matching classification tree type node was found in the matching step and said matching classification tree type node indicates that further nodes can be created as a consequence of attributes thereof that are discoverable, then
   creating at least one new classification tree type node; thereupon
   associating said first flow specification with said at least one newly-created classification tree type node; and thereupon
   incorporating said at least one newly-created classification tree type node into said plurality of classification tree type nodes so that policies can be applied to traffic based only on said discoverable attributes of said at least one newly-created classification tree type node.

3. The method of claim 2 wherein said discoverable attributes are assigned a processing priority relative to one another.

4. The method of claim 2 further comprising the steps of:
   for at least a second flow having a second flow specification, recognizing said second flow specification and said first flow specification to comprise together a service aggregate; thereupon
   associating said first flow specification and said second flow specification with a newly-created classification tree node, said newly-created classification tree type node having a first traffic specification corresponding to said first flow specification and a second traffic specification corresponding to said second flow specification.

5. The method of claim 2 farther comprising the steps of:
   applying policies from said newly-created classification tree type nodes to instances of detected traffic.

6. The method of claim 2 further comprising the steps of:
   for a subclassification under a specified criterion comprising a specified attribute name and a value, if a matching classification tree type node was found in the matching step, said matching classification tree type node having at least one child classification tree type node, applying the matching, associating, and incorporating steps to a particular child classification tree type node of said matching classification tree type node as a part of classification.

7. The method of claim 2 wherein the parsing step further comprises the steps of:
   examining data contained within a plurality of component packets belonging to said first flow for any number of a plurality of indicators of any of the following:
      a protocol;
      a service; thereupon, matching said plurality of indicators to said classes represented by a plurality of said classification tree type nodes.

8. The method of claim 2 further including measuring traffic load and invoking said classification upon achievement of a minimum usage threshold.

9. The method according to claim 2 wherein said matching step is applied to hierarchically-recognized classes.

10. A system for automatically classifying traffic in a packet telecommunications network, said network having any number of flows, including zero, comprising:
    a plurality of network links upon which said traffic is carried;
    a network routing means; and a processor means operative to:

determine application type of a flow;

for said application type of said flow, parse a packet of said flow into a first flow specification, said first flow specification containing information as attributes, said attributes being specific to said application type and wherein selected ones of said attributes are discoverable; thereupon match the first flow specification of the parsing step to a plurality of classes represented by a plurality of nodes of a classification tree type, each said classification tree type node having a traffic specification; thereupon if a matching classification tree type node was found in the matching step and said matching classification tree type node indicates that further nodes can be created as a consequence of attributes thereof that are discoverable, then associate said first flow specification with said at least one newly-created classification tree type node; thereupon create at least one new classification tree type node; and thereupon incorporate said at least one newly-created classification tree type node into said plurality of classification tree type nodes so that policies can be applied to traffic based only on said discoverable attributes of said at least one newly-created classification tree type node.

11. The system of claim 10 wherein said processor means is further operative to include measuring traffic load and invoking said classification upon achievement of a minimum usage threshold.

12. The system according to claim 10 wherein said processor means is further operative to apply said matching step to hierarchically-recognized classes.

13. A method for classifying traffic in a packet telecommunications network, said network having any number of flows, including zero, said method comprising the steps of:

parsing a packet into a first flow specification, said first flow specification having discoverable attributes; thereupon, matching the first flow specification of the parsing step to a plurality of classes represented by a plurality of classification tree type nodes, each said classification tree type node having a traffic specification; thereupon, if a matching classification tree type node was found in the matching step and said matching classification tree type node indicates through said discoverable attributes that further nodes can be created, creating at least one new classification tree type node; thereupon associating said first flow specification with at least one more newly-created node; thereupon, displaying to a network administrator a representation of traffic according to said traffic specification for use in manual intervention.

14. The method according to claim 13 further including the step of sorting said traffic representation according to most recently occurring.

15. The method according to claim 13 further including the step of sorting said traffic representation according to most data transferred for a preselected period of time.

16. The method of claim 13 further including measuring traffic load and invoking said classification upon achievement of a minimum usage threshold.

17. The method according to claim 13 wherein said matching step is applied to hierarchically-recognized classes.

* * * * *